United States Patent
Wight et al.

(10) Patent No.: US 6,917,596 B1
(45) Date of Patent: Jul. 12, 2005

(54) METHOD OF ADDRESSING PHYSICAL PROBLEMS OF A TOPOLOGICAL NETWORK USING A TOPOLOGY ENGINE

(75) Inventors: Mark S. Wight, Ottawa (CA); Gwenda Lindhorst-Ko, Ottawa (CA)

(73) Assignee: Nortel Networks Limited, St. Laurent (CA)

( * ) Notice: Subject to any disclaimer, the term of this patent is extended or adjusted under 35 U.S.C. 154(b) by 860 days.

(21) Appl. No.: 09/708,036

(22) Filed: Nov. 8, 2000

(51) Int. Cl.[7] .......................... H04L 12/28; H04L 12/50
(52) U.S. Cl. ................... 370/254; 370/351; 370/357; 703/13
(58) Field of Search ................. 370/254, 255, 370/256, 351, 357, 381; 703/13, 22; 706/15, 19

(56) References Cited

U.S. PATENT DOCUMENTS

| | | | | |
|---|---|---|---|---|
| 3,735,109 A | * | 5/1973 | Berthelemy et al. ........... 703/3 |
| 5,263,121 A | * | 11/1993 | Melsa et al. .................. 706/19 |
| 5,323,394 A | * | 6/1994 | Perlman ...................... 370/238 |
| 5,398,012 A | * | 3/1995 | Derby et al. ................. 370/238 |
| 5,537,394 A | * | 7/1996 | Abe et al. .................... 370/252 |
| 5,561,790 A | * | 10/1996 | Fusaro ......................... 703/26 |
| 6,044,075 A | * | 3/2000 | Le Boudec et al. ......... 370/351 |
| 6,067,572 A | * | 5/2000 | Jensen et al. ................ 709/241 |
| 6,130,875 A | * | 10/2000 | Doshi et al. ................. 370/225 |
| 6,137,782 A | * | 10/2000 | Sharon et al. ............... 370/255 |
| 6,141,325 A | * | 10/2000 | Gerstel ........................ 370/238 |
| 6,223,149 B1 | * | 4/2001 | Margulis et al. .............. 703/27 |
| 6,256,295 B1 | * | 7/2001 | Callon ......................... 370/254 |
| 6,339,587 B1 | * | 1/2002 | Mishra ........................ 370/255 |
| 6,442,147 B1 | * | 8/2002 | Mauger et al. ............. 370/321 |
| 2002/0015386 A1 | * | 2/2002 | Kajiwara .................... 370/248 |

* cited by examiner

*Primary Examiner*—Seema S. Rao
*Assistant Examiner*—Robert C. Scheibel, Jr.
(74) *Attorney, Agent, or Firm*—Jeffrey M. Measures; Borden Ladner Gervais LLP

(57) ABSTRACT

The topology of a network is represented, or emulated, by a topology engine comprising processing elements interconnected via a connection matrix. Queries representing physical problems of the network are supplied by a host processor to the topology engine, where they are processed in the processing elements in accordance with the topology to produce responses which are returned to the host processor. In particular, the network can be a communications network and the queries can comprise search requests for determining connection paths between devices of the network. The topology engine can use processors with multiple instances so that it is more compact than the communications network that it represents.

17 Claims, 1 Drawing Sheet

METHOD OF ADDRESSING PHYSICAL PROBLEMS OF A TOPOLOGICAL NETWORK USING A TOPOLOGY ENGINE

This invention relates to a method of addressing physical problems of a topological network, and to a topology engine for use in carrying out such a method. In particular, this invention relates to methods of determining connection paths in a communications network, and to a connection engine for use in carrying out such methods.

BACKGROUND OF THE INVENTION

There are many physical problems which have a geometric, or topological, nature. Examples of such problems include pattern matching, data structure searching, simulation of stress and distortion in a physical structure, and simulation of control systems. Another particular example of a physical problem having a geometric nature, in the context of which the present invention is described in detail, is the problem of determining connection paths through a network, such as an optical transmission network, in such a manner that the connection paths are optimized in accordance with predetermined criteria.

The prior art includes various multiprocessing techniques, in which tasks are divided among a plurality of processing elements and information is exchanged between these processing elements. In such techniques, the division of tasks is designed to minimize the exchange of information. Information exchange can take place in many different ways, for example from using shared local memory to packet communications via the Internet or some other large network.

Such techniques also include neural networks, in which port weighting between processing elements interconnected in a structured manner is adapted so that the network "learns" over time. Other techniques, for example for ASIC hardware simulation or for classification of packets in network processors, are also known for solving specific problems of logic simulation and packet processing.

None of these techniques provides a general tool for addressing physical problems of a topological network.

SUMMARY OF THE INVENTION

According to one aspect, this invention provides a method of addressing physical problems of a topological network, comprising the steps of: representing a topology of the network by a plurality of processing elements interconnected via a connection matrix, said processing elements and connection matrix constituting a topology engine; supplying queries representing physical problems of the network from a host processor of the network to the topology engine; processing the queries in the processing elements of the topology engine in accordance with the topology of the topology engine; and supplying responses to the queries from the topology engine to the host processor.

Thus in accordance with this invention a topology engine serves to emulate a topological network, i.e. a structure having a geometrical configuration, and a problem relating to the topological network is addressed by applying it to the topology engine, which then provides a response to the problem.

A plurality of the processing elements of the topology engine can be represented by different instances of a respective processor, so that the topology engine can have a smaller number of processors than processing elements. In this manner, the topology engine can provide a more compact form than the network which it represents.

Preferably, each processing element of the topology engine has a respective address and the connection matrix communicates packets between the processing elements using their respective addresses, the queries and responses being supplied in the form of packets containing information relating to the queries and responses, and the step of processing the queries comprising communicating packets between the processing elements of the topology engine and processing the packets in dependence upon information in the packets and information stored in the processing elements.

The host processor of the network can provide the information stored in the processing elements, which can comprise, for each processing element, the address of each other processing element for which a connection is provided via the connection matrix, and at least one parameter associated with such connection.

The invention also provides a topology engine comprising a plurality of processing elements and a connection matrix for interconnecting the processing elements, arranged for carrying out the above method.

A particular aspect of the invention provides a method of determining connection paths in a communications network having connections between network devices managed by a host processor of the network, comprising the steps of: representing a topology of said network by a topology of a connection engine, the connection engine comprising processing elements representing respective network devices and connections between the processing elements representing respective connections between the network devices; supplying from the host processor to the connection engine a connection search request identifying start and end network devices for a connection; in response to the connection search request, communicating information between processing elements of the connection engine to determine a connection path between processing elements of the connection engine representing the start and end network devices for said connection; and supplying information identifying the connection path from the connection engine to the host processor.

This method can further comprise the step of supplying from the host processor to the connection engine information for maintaining in the connection engine a record of connections in the communications network.

The invention further provides a method of determining connection paths in a communications network having connection between network devices managed by a host processor of the network, comprising the steps of: representing each network device by a respective processing element of a connection engine; representing each connection between the network devices by a respective connection between the processing elements of the connection engine representing the respective network devices; supplying from the host processor to the connection engine information for maintaining in the connection engine a record of connections in the communications network; supplying from the host processor to the connection engine a connection search request identifying start and end network devices for a connection; in response to the connection search request, communicating information between processing elements of the connection engine, via the connections between the processing elements and in dependence upon the record of connections maintained in the connection engine, to determine a connection path between processing elements of the connection engine representing the start and end network devices; and supplying information identifying the connection path from the connection engine to the host processor.

The connection engine can comprise a plurality of processors each having a plurality of different instances constituting respective ones of the processing elements, whereby the connection engine has a smaller number of processors than the number of network devices of the communications network.

In an embodiment of the invention described below, each processing element of the connection engine has a respective address and the connections between the processing elements are constituted by packet communications using the respective addresses of the processing elements. The connection search request comprises a connection search packet addressed to the processing element of the connection engine representing the start network device for the connection, and said information identifying said connection path is supplied from the connection engine to the host processor in a packet from the processing element of the connection engine representing the end network device for the connection. The step of communicating information between processing elements to determine said connection path comprises propagating connection search packets successively from processing elements receiving connection search packets to other processing elements connected thereto, the successively propagated connection search packets being supplemented with the addresses of the processing elements via which they are propagated.

The invention furthermore provides a connection engine comprising a plurality of processing elements and a connection matrix for interconnecting the processing elements, arranged for carrying out the methods recited above.

BRIEF DESCRIPTION OF THE DRAWINGS

The invention will be further understood from the following description with reference to the accompanying drawings, in which by way of example.

DETAILED DESCRIPTION

Figure 1:
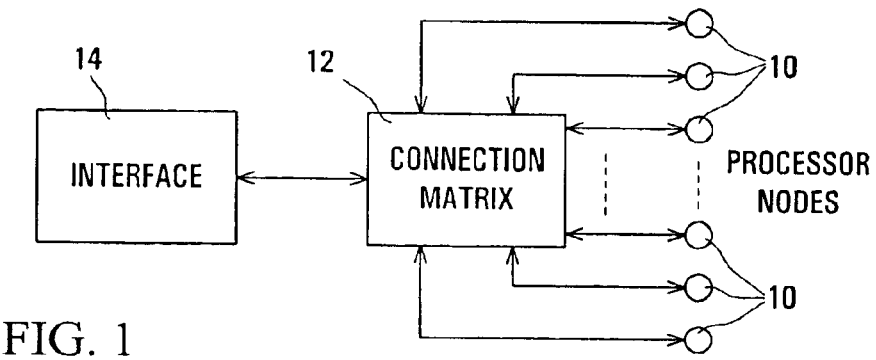
FIG. 1 illustrates in a block diagram a topology engine in accordance with this invention.

Referring to the drawings, FIG. 1 illustrates a topology engine in accordance with the invention, comprising a plurality of processing elements or processor nodes 10 each of which is connected to a connection matrix 12, and an interface 14 which is also illustrated as being connected to the connection matrix 12 and serves to couple one, some, or all of the processor nodes 10 to a host system, not shown.

The host system can be any system or network to which a physical problem having a geometric nature relates; examples of such problems are mentioned above in the background of the invention. In the topology engine of FIG. 1, interconnections among the processor nodes 10 are set up via the connection matrix 12 in a manner to emulate the geometry, or topology, of the problem to be addressed. This is referred to as a context of the topology engine. The topology engine can be set up with any of a plurality of contexts, or different connection patterns of the processor nodes 10 using the connection matrix 12, for different purposes, and these contexts can be static or they can be programmed to change in a dynamic manner. Time division multiplexing of different connection patterns can be used to provide different contexts concurrently.

As indicated above, for example one context may be constituted by a connection pattern corresponding to a topology of a problem to be addressed; another context may be constituted by a connection pattern of the processor nodes 10 with the interface 14 via the connection matrix 12 for distribution of configuration information for setting up the topology engine. A further context may be constituted by a connection pattern for the collection of information for hierarchical or time division multiplexed simulation of problems whose solution requires a greater number of nodes than are present in the topology engine.

Information related to the topology engine of FIG. 1, for example configuration information and connection pattern information for each context, can be stored in the processor nodes 10 and/or the connection matrix 12, which may itself comprise a processor. Accordingly, the topology engine can be set up statically using one or more connection patterns, or contexts, to solve a problem communicated from the host system via the interface 14. Alternatively, the processor nodes 10 can be treated in a pooled manner, with free nodes being added or unneeded nodes being deleted from a connection pattern via the connection matrix dynamically to construct a problem, a solution to which may be the resulting configuration of the resulting interconnected processor nodes 10.

Each connection pattern among the processor nodes 10 and the connection matrix 12 defines a network, in which each connection is defined as a point-to-point link between two processor nodes. Information is exchanged between the connected nodes in packets, and the connection matrix 12 is conveniently constituted by a packet cross-connect for example as further described below. Each connection between two nodes has an associated set of properties, or parameters, which determines not only the point-to-point nodes to which the connection relates but also one or more other properties. In particular, these other properties can comprise a weight parameter for example representing a cost for the particular connection, a delay parameter for example representing a packet delay via the connection, a priority parameter for the connection, a probability parameter which for example can be used to partially or fully randomize the solution of a problem or to mimic and test random or chaotic components in a problem, and vector properties such as a direction and/or directional tension of the connection.

The processor nodes 10 can also have an arbitrary form, which can be tailored to suit the solution of a specific set of problems. For example, each processor node 10 may comprise a reduced instruction set (RISC) processor, or a state machine, which can generate, propagate, and terminate packets and can perform tasks such as data storage and packet queuing. Stored data can include a problem data set, a context (connection pattern) data set, and a set of data processing instructions or rules for each context, and these data sets can be static or they can be dynamically updated as indicated above.

The generation of a packet includes the connection of packet fields including a header and a data field, and launching the packet on one or more connections. The termination of a packet includes packet identification and actions which are determined from data and rules of the processor node and/or the data contents of the packet. The propagation of packets combines the actions of packet termination and generation, typically resulting in multiple packets being launched from a processor node receiving a single packet. Packet queuing can be provided at the connection inputs and/or the outputs of a processor node to facilitate prioritizing of packets and efficient packet handling and processing.

It can be seen, therefore, that the topology engine of FIG. 1 in accordance with the invention comprises the processor nodes 10, connections among the processor nodes which are established by the connection matrix 12 in accordance with at least one connection pattern whose topology represents a problem to be solved, the connections having associated communication parameters and the processor nodes storing processing rules for applying to communicated information to address the problem, and the interface 14 for communication of the problem and solution with a host system.

For example, in an application of the topology engine for modelling forces in a three-dimensional physical structure, the connections can be provided so that the network of nodes and connections of the topology engine represents the topology of the physical structure, each connection can be assigned a directional tension parameter, and each node may operate to balance forces and propagate tension information to other nodes to which it is connected. A host system provides the configuration information for setting up the topology engine connections and parameters via the interface 14, and resulting information constituting the modelled forces is communicated from the processor nodes back to the host system via the interface 14. In such an application, the host system can provide dynamic changes to modify the configuration of the topology engine and receive information resulting from such modifications.

Figure 2:
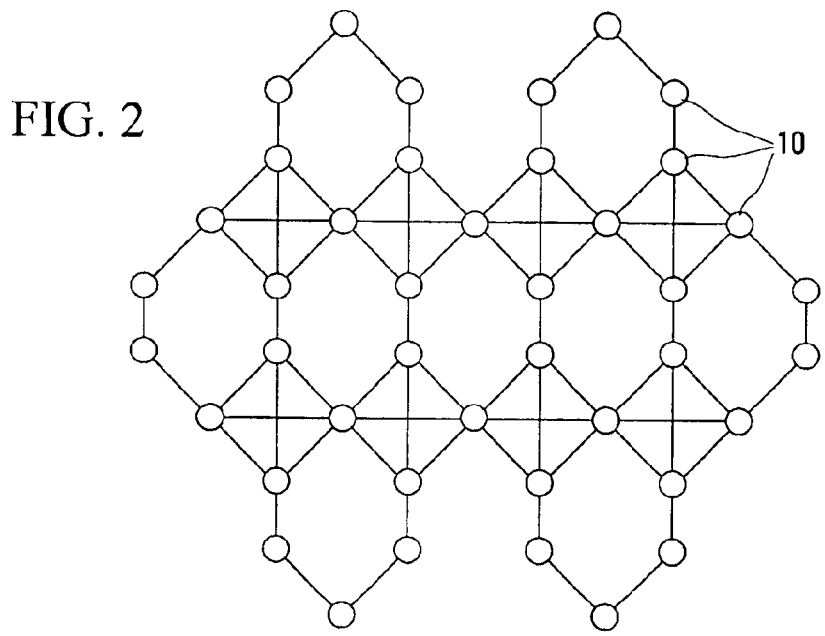
FIG. 2 shows an example of a specific configuration of a topology engine in accordance with an embodiment of the invention.

Purely by way of illustration of one or innumerable possible examples, FIG. 2 shows a specific configuration of point-to-point connections, represented by lines, between pairs of processor nodes 10, each represented by a circle. The connections or lines are provided via the connection matrix 12 of FIG. 1, not shown in FIG. 2, thereby providing the interconnected processor nodes with a topology as illustrated in FIG. 2 to match a particular problem. For clarity in illustrating this topology, the interface 14 is not shown in FIG. 2, but it can be connected with each processor node 10 via a point-to-point connection directly via the connection matrix, or indirectly via other ones of the processor nodes in the topology engine.

Another example of an application of the topology engine, in the context of which a particular embodiment of the invention is described in greater detail below, is for determining optimum connection paths in a communications network. In this example, which corresponds to a maze problem, each processor node represents a device of the communications network and each point-to-point connection between processor nodes represents a point-to-point communications link between devices of the communications network. Thus the topology engine is configured to represent the topology of the communications network.

In order to reduce the physical complexity of the topology engine, and enable it to have a much smaller number of processor nodes than the communications network has devices, different instances of a single physical processor node can be used to represent different ones of a plurality of devices of the communications network, as further described below. In any event, the host system in this example of the topology engine is constituted by a processor of the communications network which serves for managing connections, e.g. setting up and taking down actual connections in the communications network. This processor of the host system, referred to below as a host processor, serves to provide connection problems to, and receives connection answers from, the topology engine via its interface as described further below.

Briefly, in this example of the topology engine, referred to below as a connection engine because it serves to determine connection paths, the host processor supplies a connection problem via the interface 14. For example this connection problem may be a request to determine an optimal connection path, in accordance with various criteria such as a desired bandwidth and a maximum delay, between start and end devices of the communications network, and may be communicated in the form of a packet addressed to a processor node corresponding to the start device to determine a preferred connection path to the end device. The processor node corresponding to the start device consequently propagates packets which travel on multiple paths through the connection engine, these packets being modified in accordance with parameters of the connection links and processor nodes via which they pass, one or more of them ultimately reaching the processor node corresponding to the end device, which processor node accordingly determines one or more preferred connection paths through the communications network. This one or more preferred connection paths are then communicated from the processor node corresponding to the end device via the interface 14 to the host processor as an answer to the connection problem, and the host processor sets up a connection in the communications network accordingly. It can be appreciated that these processes in the connection engine can take place for many different connection requests at the same time.

Figure 3:
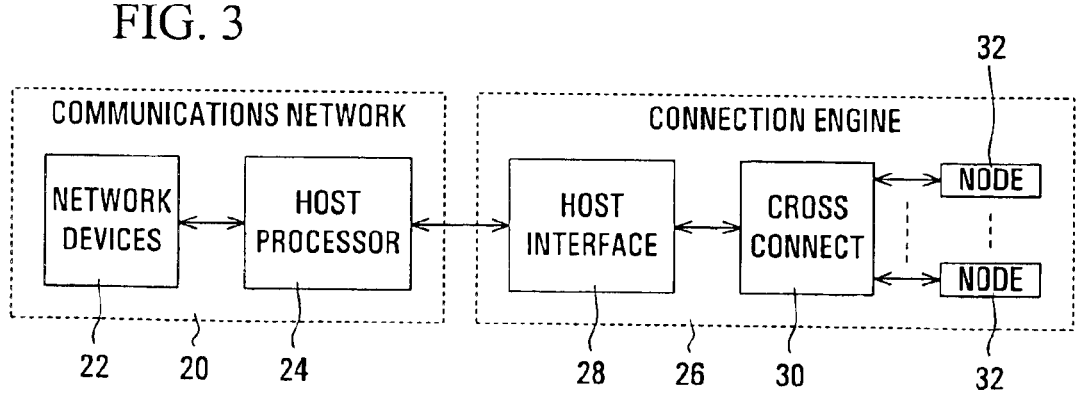
FIG. 3 illustrates in a block diagram a connection network and host processor in combination with a connection engine which constitutes a topology engine in accordance with an embodiment of this invention.

FIG. 3 shows a block diagram of the communications network 20, shown within a dashed-line box and comprising the network devices 22 and the host processor 24, and the connection engine 26, also shown within a dashed-line box and comprising the host interface 28 corresponding to the interface 14 of FIG. 1, a packet cross connect 30 which constitutes the connection matrix 12 of FIG. 1, and processor nodes 32 only two of which are shown and which constitute the nodes 10 of FIG. 1.

As indicated above, different instances of each processor node 32 can be used to represent different ones of the network devices 22. By way of example, there may be up to 32 processor nodes 32, and each of these may have up to 32 instances to represent up to 32 network devices 22, so that the communications network can have up to 1024 network devices represented within the connection engine 26. In this manner, a relatively compact form of the connection network 26 can determine connection paths in a relatively large communications network 20. Obviously, the numbers given here are by way of example and can be changed to suit particular needs.

In the following description, the processor nodes are referred to collectively by their reference number 32 as above and individually as nodes #0 to node #31, and their instances are referred to individually as processor node-instances in the form #X-Y, where X (from 0 to 31) refers to the individual processor node and Y (from 0 to 31) refers to the instance of the processor node. Thus for example processor node-instance #7-16 would refer to instance number 16 of processor node #7, representing an individual one of the network devices 22 in the communications network 20. However, it should be appreciated that each processor node-instance can alternatively be constituted by, and can be considered as, a separate processor node.

In operation of the arrangement of FIG. 3, as outlined above the host processor 24 manages connections in the communications network 20, and uses the connection engine 26 to determine connection paths. To this end, the host processor 24 configures the connection engine 26 with the structure of the communications network 20 in accordance with a node network table containing information as described below. In this embodiment of the invention, each of the processor nodes 32 stores that part of the overall network table which relates to its instances and connections. This is described further below with reference to Table 1, which illustrates by way of example part of the network table stored at a processor node and examples of the information which may be stored therein.

TABLE 1

| Processor Node-Instance | Links To Other Processor Node-Instances | | | Connection Paths | |
|---|---|---|---|---|---|
| | Number | Free BW | Weight | ID | BW |
| #22-0 | #1-3 | 2 | 7 | 100 | 3 |
| | | | | 14 | 4 |
| | | | | 105 | 2 |
| | #17-3 | 7 | 4 | 221 | 6 |
| | | | | 75 | 4 |
| | #24-6 | 5 | 8 | 22 | 3 |
| | | | | 304 | 10 |
| ... | ... | ... | ... | ... | ... |
| #22-N | #14-5 | 2 | 3 | 105 | 8 |
| | | | | 146 | 7 |
| | | | | 507 | 2 |
| | #24-31 | 7 | 9 | 228 | 4 |
| | | | | 759 | 2 |

Table 1 relates to processor node #22, assumed to have N+1 instances which constitute processor node-instances #22-0 to #22-N, for which Table 1 only shows information related to the processor node-instances #22-0 and #22-N.

For each such processor node-instance, the node network table provides information for each point-to-point connection or link to another processor node-instance, representing the connections in the communications network 20 from the respective network device 22 to other network devices 22. For example, as shown in Table 1 the processor node-instance #22-0 has connections to processor node-instances #1-3, #17-3, and #24-6, representing three such connections in the communications network 20. Associated with each such connection or link are parameters which as shown in Table 1 comprise a free bandwidth (BW) and a weight. The free bandwidth represents a currently available bandwidth for the link, and is a dynamic parameter which is updated as described below. The weight represents a cost of using the respective link, and for example represents a combination of factors such as the length and/or delay associated with the link, and/or utilization of the link. Thus the weight can be either a static parameter that is not changed after being initially set up, or a dynamic parameter that is also updated as described below.

Each such connection or link to another processor node-instance can serve for one or more connection paths through the communications network 20, each of which is identified by a respective connection path identity (ID) and is allocated a respective path bandwidth (BW). Each connection path identity uniquely identifies a respective end-to-end connection path within the communications network 20. For example, Table 1 shows the connection path between the processor node-instances #22-0 and #1-3 as currently serving for three connection paths, with identity numbers 100, 14, and 105, and path bandwidths of 3, 4, and 2 units respectively. This information in the node network table is also updated dynamically as described below as connection paths are changed in the communications network 20.

As indicated above, communications among the processor node-instances and the host interface 28 (which can be allocated one of the processor node-instance addresses for communications to it) is by packets coupled between the processor nodes 32 via the cross connect 30, which accordingly provides connections (e.g. via a 16-bit wide path) between any two of the processor node-instances and between any of the processor node-instances and the host interface 28. To this end, the cross connect 30 receives packets from each processor node-instance and stores the packets in queues for the respective processor node-instances as identified by destination addresses in the respective packets, as described below. From each queue, the packets are delivered to their respective destination addresses. The packets are queued and delivered in accordance with respective priorities, the priority of each packet being inverse to an accumulated weight contained in the packet as described below, and packets from the host interface 28 being allocated a highest priority.

Via the host interface 28, the host processor 24 effects any of the following operations within the connection engine 26:

1. add or delete a processor node-instance;
2. add or delete a link between processor node-instances;
3. execute or terminate a connection search;
4. add or delete a connection path and update bandwidths;
5. determine a connection path route (connection query)
6. reserve a potential connection path route.

The first two of these operations are used for initially establishing the node network table in accordance with the physical structure of the communications network 20, and for subsequently changing the table in accordance with changes in the communications network. Thus the processor node-instances are allocated to respective network devices 22 by the connections or links determined for the processor node-instances in the node network table as described above. For each such link, the free bandwidth and weight are supplied to the respective processor node as parameters in a packet from the host interface 28; initially there are no connections via the links.

A connection search is initiated, as indicated above, by the host interface 28 instructing a processor node-instance corresponding to the start device to launch a connection search packet. The contents of a connection search packet are, for example, as follows:

10 bits—destination address;
16 bits—connection path identity;
10 bits—connection path bandwidth;
4 bits—weight type;
12 bits—accumulated weight;
12 bits—maximum weight (optional);
10 bits per node—route traverse list;
4 bits—packet validation (e.g. cyclic redundancy check).

The destination address is the processor node-instance representing the network device 22 constituting the end of a desired connection, the 10-bit size of the address being sufficient to uniquely identify each of up to 1024 processor node-instances and corresponding network devices 22. The connection path identity and bandwidth are as described above. The weight type can be used to determine a particular manner of calculating weights in each processor node 32, and this field can be extended if a particular type of weight calculation requires additional information. For example, this parameter may be used to avoid a connection path for a protection route overlapping a route which is to be protected, by adding a weight for overlap of a specified connection path.

The accumulated weight is a total of weights for the route traversed so far, and for connection search packets launched by the start device processing node-instance is the weight of the link for which the respective packet is launched. The optional maximum weight is used to reduce propagation of connection search packets which are not likely to produce useful connection path routes. The route traverse list identifies the 10-bit addresses of all the processor node-instances traversed in producing the connection search packet, initially identifying only the address of the first processor node-instance representing the start device.

The processor node-instance representing the start device accordingly sends a respective connection search packet for each processor node-instance to which it is linked as determined in the node network table. Each processor node-instance receiving connection search packets removes them from its input queue and processes them in accordance with their priorities (order of minimum accumulated weights). The packet processing of each connection search packet comprises determining whether the packet has reached its destination address and, if not, identifying valid further propagation links, calculating a weight for each such link, adding the calculated weight to the accumulated weight of the packet and extending the route traverse list with the address of this processor node-instance, and launching the updated connection search packet on each valid link. The identification of valid further propagation links serves to exclude links to node-instances already included in the route traverse list, links with insufficient bandwidth, and links for which the accumulated weight would exceed any maximum weight specified.

In this manner, the network of processor node-instances is flooded with connection search packets, the queuing and priority processing of packets in each processor node-instance ensuring that connection search packets most likely to result in a useful connection route are processed first. The processor node-instance representing the end network device waits for its input queue to fill up with connection search packets which have reached this destination, and then it identifies the lowest weight packet and propagates this to the host interface 28. Alternatively, this processor node-instance can identify a plurality of lowest weight packets and forward each of these to the host interface 28, enabling the host processor to choose from any of a plurality of possible routes for the desired connection, as may be particularly desirable in the event that many connection searches are being performed simultaneously. In any event, the host interface then sends a packet containing a command to terminate the connection search for the identified connection path, in response to which remaining connection search packets for this connection path identity are removed from the queues for all of the processor node-instances.

The connection path route determined as described above is communicated from the host interface 28 to the host processor 24, which sets up a connection accordingly in the communications network 20 via the network devices 22 corresponding to this route between the start and end devices. Correspondingly, the host interface 28 adds the connection path in the connection engine 26 by updating the node network table accordingly.

To this end, the host interface 28 modifies the selected lowest weight connection search packet, containing the route traverse list for the connection, to produce a connection set-up packet which it sends to the processor node-instance representing the start network device. This processor node-instance processes the packet to determine the next processor node-instance in the route traverse list, adds the connection path identity and bandwidth to the node network table for its link to this next processor node-instance and reduces the free bandwidth for this link in the table accordingly, and forwards the packet to this next processor node-instance. These steps are repeated for each processor node-instance in the route traverse list, until the processor node-instance representing the end network device 22 is reached.

In response to the host processor 24 terminating a connection path in the communications network, the host interface 28 sends a corresponding packet to the processor node-instance corresponding to the start network device, which removes the connection path information from the node network table and updates the free bandwidth of the respective link accordingly, and forwards the packet to the next processor node-instance, this process being repeated in each processor node-instance until the processor node-instance corresponding to the end network device is reached.

Alternatively, it can be appreciated that a connection path can be removed from the connection engine by the host interface 28 sending a command to all of the processor node-instances to remove from the node network table information relating to the identified connection path.

The host processor 24 can also issue a connection query, in response to which the host interface 28 sends a query packet containing the connection path identity to the processor node-instance representing the start device, and this is propagated via the route of the connection determined from the network node table to establish a route traverse list as described above, without altering the information stored in the node network table, the completed route traverse list being communicated from the processor node-instance representing the end network device to the host interface 28 to provide a connection path route to the host processor 24.

The above description relates to a relatively simple form of connection engine, which can be modified and made more sophisticated in various ways. For example, the connection engine can be modified to enable a connection search to be launched from the processor node-instances representing both of the start and end network devices, with each intermediate node-instance storing a list of candidate routes with least weights, for selection of a complete route by the host interface. An intermediate node-instance can be specified for a connection, and a complete route can be created by concatenating resulting sub-routes to the intermediate node-instance. The ability of the connection engine to perform simultaneous connection searches can be used to determine two non-overlapping connections using two connection searches at the same time, with processor node-instances which receive connection search packets for both searches forwarding only that one of them which has the lowest weight. In addition, iterative techniques can be used to determine optimum connection paths, with a non-overlapping set of connection paths being determined by selecting best partially-overlapping routes and initiating searches for connection routes orthogonal to the selected candidates.

Furthermore, the simple form of connection engine described above can be expanded to provide reservation techniques, which can be used to reserve potential connection path routes in the connection engine as connection search packets are propagated through its network of processor node-instances, thereby ensuring that an optimum reserved route which is ultimately selected in the connection engine 26 is actually available for establishing the connection path in the communications network 20, at which time reserved and unused routes are released in the connection engine. Reservation of potential path routes for one connection search also tends to block potential path routes for other simultaneous connection searches, so that a compromise may be necessary to facilitate simultaneous connection searches with reservation techniques, for example with reservation of only a limited number of potential path routes for which the connection search packets have relatively low accumulated weights.

In addition, various techniques can be applied to reduce the processing and storage requirements of the connection engine. One of these techniques is the optional maximum weight criterion described above. Using this a connection search can initially be performed with a low maximum weight for which relatively little processing is required, and can be repeated with a higher maximum weight if no connection route is determined. Queuing of connection search packets enables only lowest weight packets to be selected and forwarded. In addition, limits can be placed on the number of connection search packets which traverse a processor node-instance, and/or the number of processor node-instances that a connection search packet is allowed to traverse.

Although in the connection engine described above the node network table is distributed among the processor nodes 32 with each node storing information relates to its links as described above with reference to Table 1, this need not be the case, and in other arrangements information could be distributed differently. For example, the connection information could instead be provided in the cross connect, with processing information stored in the processor nodes. In any event, it can be appreciated that the connection engine 26 replicates the structure of the physical communications network 20 by the connection provided among the processor node-instances, so that a topological connection problem of the network 20 can be addressed by applying it to the connection engine 26, and then using the results to manage connections in the communications network 20. As described above, the allocation of instances of the processor nodes 32 to different network devices enables a relatively small connection engine to represent a relatively large communications network.

However, the invention is not limited to this arrangement, and it can be appreciated that a processor node 32 could be provided for each network device 22. In this case, each processor node 32 can be located with, and potentially incorporated into, the network device 22 which it represents, thereby distributing the processor nodes of the connection engine 26 as widely as the communications network 20 which it represents. Alternatively, groups of network devices 22 in respective geographical areas can be represented by respective processor nodes 32, so that the connection engine 26 is partly compressed relative to and partly as distributed as the communications network 20 which it represents.

Conversely, the connection engine 26 can be implemented in a relatively compact form, for example using an application-specific integrated circuit to provide state machines constituting a relatively large number of the processor nodes 32 and their interconnections. A plurality of such integrated circuits can be provided to increase the number of processor nodes and/or processing speed.

Thus although particular embodiments of the invention are described in detail above, it can be appreciated that these and numerous other modifications, variations, and adaptations may be made within the scope of the invention as defined in the claims.

What is claimed is:

1. A method of addressing physical problems of a topological network, comprising the steps of:

representing a topology of the network by a plurality of processing elements interconnected via a connection matrix, said processing elements and connection matrix constituting a topology engine;

supplying queries representing physical problems of the network from a host processor of the network to the topology engine;

processing the queries in the processing elements of the topology engine in accordance with the topology of the topology engine; and supplying responses to the queries from the topology engine to the host processor;

wherein each processing element of the topology engine has a respective address and the connection matrix communicates packets between the processing elements using their respective addresses, wherein the queries and responses are supplied in the form of packets containing information relating to the queries and responses, and the step of processing the queries comprises communicating packets between the processing elements of the topology engine and processing the packets in dependence upon information in the packets and information stored in the processing elements.

2. A method as claimed in claim 1 and comprising the step of representing a plurality of the processing elements of the topology engine by different instances of a respective processor, whereby the topology engine has a smaller number of processors than processing elements.

3. A method as claimed in claim 1 and including the step of providing said information stored in the processing elements from the host processor of the network.

4. A method as claimed in claim 3 wherein said information stored in the processing elements comprises, for each processing element, the address of each other processing element for which a connection is provided via the connection matrix, and at least one parameter associated with such connection.

5. A topology engine comprising a plurality of processing elements and a connection matrix for interconnecting the processing elements, arranged for carrying out the method of claim 1.

6. A method of determining connection paths in a communications network having connections between network devices managed by a host processor of the network, comprising the steps of:

representing a topology of said network by a topology of a connection engine, the connection engine comprising processing elements representing respective network devices and connections between the processing elements representing respective connections between the network devices;

supplying from the host processor to the connection engine a connection search request identifying start and end network devices for a connection;

in response to the connection search request, communicating information between processing elements of the connection engine to determine a connection path between processing elements of the connection engine representing the start and end network devices for said connection; and supplying information identifying the connection path from the connection engine to the host processor;

wherein each processing element of the connection engine has a respective address and the connections between the processing elements are constituted by packet communications using the respective addresses of the processing elements.

7. A method as claimed in claim 6 wherein the connection engine comprises a plurality of processors each having a plurality of different instances constituting respective ones of the processing elements, whereby the connection engine has a smaller number of processors than the number of network devices of the communications network.

8. A method as claimed in claim 6 wherein the connection search request comprises a connection search packet addressed to the processing element of the connection engine representing the start network device for the connection.

9. A method as claimed in claim 8 wherein the step of communicating information between processing elements of the connection engine to determine said connection path comprises propagating connection search packets successively from processing elements receiving connection search packets to other processing elements connected thereto, the successively propagated connection search packets being supplemented with the addresses of the processing elements via which they are propagated, until at least one connection search packet reaches the processing element representing the end network device for the connection.

10. A method as claimed in claim 8 wherein said information identifying said connection path is supplied from the connection engine to the host processor in a packet from the processing element of the connection engine representing the end network device for the connection.

11. A method as claimed in claim 6 and further comprising the step of supplying from the host processor to the connection engine information for maintaining in the connection engine a record of connections in the communications network.

12. A connection engine comprising a plurality of processing elements and a connection matrix for interconnecting the processing elements, arranged for carrying out the method of claim 6.

13. A method of determining connection paths in a communications network having connections between network devices managed by a host processor of the network, comprising the steps of:

representing each network device by a respective processing element of a connection engine;

representing each connection between the network devices by a respective connection between the processing elements of the connection engine representing the respective network devices;

supplying from the host processor to the connection engine information for maintaining in the connection engine a record of connections in the communications network;

supplying from the host processor to the connection engine a connection search request identifying start and end network devices for a connection;

in response to the connection search request, communicating information between processing elements of the connection engine, via the connections between the processing elements and in dependence upon the record of connections maintained in the connection engine, to determine a connection path between processing elements of the connection engine representing the start and end network devices; and supplying information identifying the connection path from the connection engine to the host processor;

wherein each processing element of the connection engine has a respective address and the connections between the processing elements are constituted by packet communications using the respective addresses of the processing elements.

14. A method as claimed in claim 13 wherein the connection engine comprises a plurality of processors each having a plurality of different instances constituting respective ones of the processing elements, whereby the connection engine has a smaller number of processors than the number of network devices of the communications network.

15. A method as claimed in claim 13 wherein the connection search request comprises a connection search packet addressed to the processing element of the connection engine representing the start network device for the connection, and said information identifying said connection path is supplied from the connection engine to the host processor in a packet from the processing element of the connection engine representing the end network device for the connection.

16. A method as claimed in claim 15 wherein the step of communicating information between processing elements to determine said connection path comprises propagating connection search packets successively from processing elements receiving connection search packets to other processing elements connected thereto, the successively propagated connection search packets being supplemented with the addresses of the processing elements via which they are propagated.

17. A connection engine comprising a plurality of processing elements and a connection matrix for interconnecting the processing elements, arranged for carrying out the method of claim 13.

* * * * *